United States Patent
Chen et al.

(10) Patent No.: US 9,609,277 B1
(45) Date of Patent: Mar. 28, 2017

(54) PLAYBACK SYSTEM OF VIDEO CONFERENCE RECORD AND METHOD FOR VIDEO CONFERENCING RECORD

(71) Applicants: NANNING FUGUI PRECISION INDUSTRIAL CO., LTD., Nanning (CN); HON HAI PRECISION INDUSTRY CO., LTD., New Taipei (TW)

(72) Inventors: Bin-Rong Chen, New Taipei (TW); Kuan-Hung Lin, New Taipei (TW)

(73) Assignees: NANNING FUGUI PRECISION INDUSTRIAL CO., LTD., Nanning (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/006,683

(22) Filed: Jan. 26, 2016

(30) Foreign Application Priority Data

Dec. 28, 2015 (TW) .............................. 104143936 A

(51) Int. Cl.
*H04N 7/15* (2006.01)
*G11B 27/10* (2006.01)
*G11B 27/34* (2006.01)

(52) U.S. Cl.
CPC ........... *H04N 7/155* (2013.01); *G11B 27/105* (2013.01); *G11B 27/34* (2013.01)

(58) Field of Classification Search
CPC H04N 7/15; H04N 7/152; H04N 7/14; H04N 7/147; H04L 12/1631; G11B 27/024

USPC .................. 348/14.01–14.16; 370/260–261; 715/753

See application file for complete search history.

(56) References Cited

U.S. PATENT DOCUMENTS

| 7,466,334 B1 * | 12/2008 | Baba .................... G11B 27/034 348/14.06 |
| 8,213,767 B1 | 7/2012 | Acharya |
| 9,179,096 B2 * | 11/2015 | Denoue ................. H04N 7/147 |
| 2010/0002066 A1 * | 1/2010 | Nelson ................ G11B 27/034 348/14.1 |
| 2014/0085404 A1 | 3/2014 | Kleinsteiber et al. |

FOREIGN PATENT DOCUMENTS

TW 201108005 A1 3/2011

\* cited by examiner

*Primary Examiner* — Melur Ramakrishnaiah
(74) *Attorney, Agent, or Firm* — Zhigang Ma

(57) ABSTRACT

A playback system for a video conferencing record includes a first electronic device obtaining a video conferencing record and a second electronic device receiving the video conferencing record. The second electronic device analyzes the video conferencing record into a plurality of chunks based on recognizing each dialog in the video conferencing record, analyzing the topic intensity of each dialog, and analyzes the relevance of each chunk to move it out of a dialog or add it to another. Video clips from the video conferencing record can be retrieved according to a keyword index, and the video clips accordingly displayed on a display. A playback method for such video conferencing record or the parts is also provided.

12 Claims, 12 Drawing Sheets

PLAYBACK SYSTEM OF VIDEO CONFERENCE RECORD AND METHOD FOR VIDEO CONFERENCING RECORD

FIELD

The topic matter herein generally relates to recording of video conferencing, playback of recording, and a related method.

BACKGROUND

Recording video conferences allows people to refer back to what happened in a meeting, or, alternatively, a person may wish to review a conference that they have not taken part in or were not available for. It also allows a user to record a presentation which can then be viewed later.

BRIEF DESCRIPTION OF THE DRAWINGS

Implementations of the present technology will now be described, by way of example only, with reference to the attached figures.

DETAILED DESCRIPTION

Figure 1:
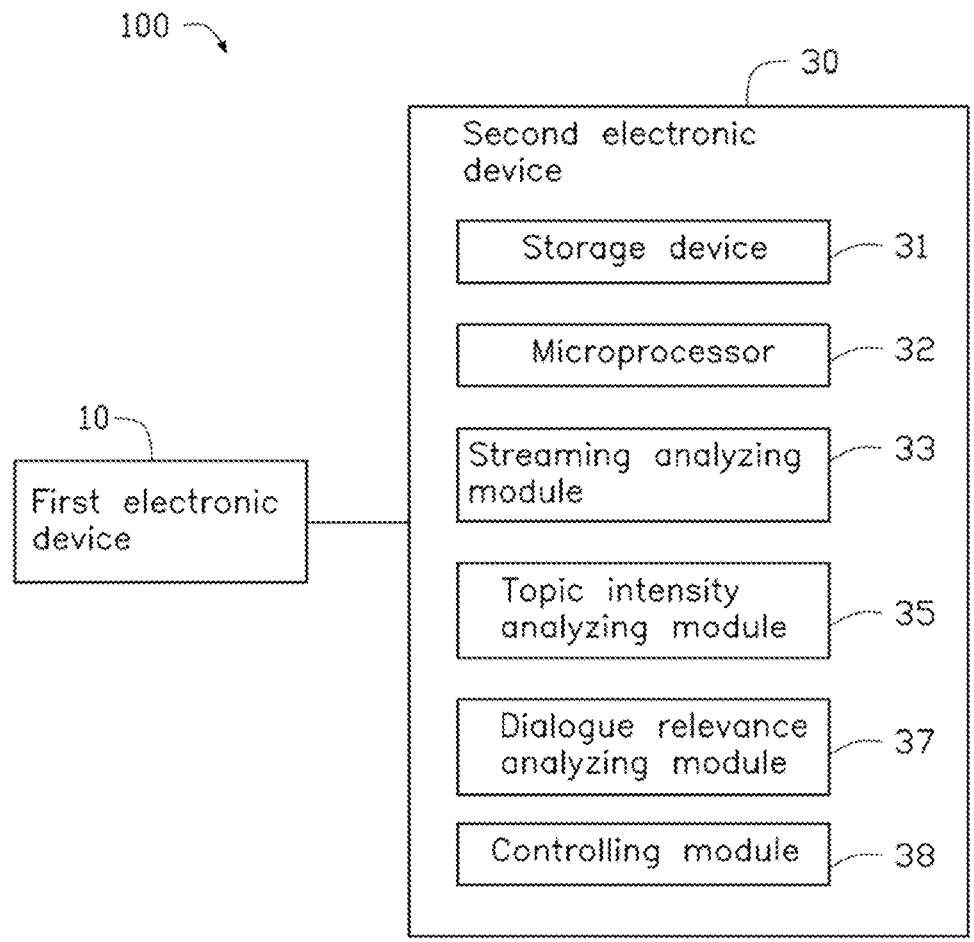
FIG. 1 is a diagrammatic view of an example embodiment of a playback system for a video conferencing record.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like. In general, the word "module", as used herein, refers to logic embodied in hardware or firmware, or to a collection of software instructions, written in a programming language. The software instructions in the modules may be embedded in firmware, such as in an erasable programmable read-only memory (EPROM) device. The modules described herein may be implemented as either software and/or hardware modules and may be stored in any type of computer-readable medium or other storage device.

The present disclosure is described in relation to a playback system for a video conferencing record. The playback system includes a first electronic device used to obtain a video conferencing record and a second electronic device used to receive the video conferencing record. The video conferencing record includes a plurality of streaming chunks. The second electronic device analyzes each streaming chunk in the video conferencing record, recognizes each dialogue in the video conferencing record according to the streaming chunk in which it is contained, and analyzes the topic intensity of each dialogue. The relevance of a plurality of streaming chunks is analyzed, to be added or moved out of a corresponding dialogue. The second electronic device can retrieve a video clip of the video conferencing record according to a keyword index, and display the video clip accordingly. A playback method for such video conferencing record is also provided.

FIG. 1 illustrates an embodiment of a playback system 100 for a video conferencing record. The playback system 100 can include a first electronic device 10 and a second electronic device 30 coupled to the first electronic device 10. In at least one embodiment, the first electronic device 10 can be a video recorder that is configured for recording video content, for example, a video conferencing record. The second electronic device 30 can be a computer or a server that is configured to parse, classify, and play the video conferencing record. In at least one embodiment, the video conferencing record can be stored in a cloud sever, and the second electronic device 30 can download the video conferencing record from the cloud server.

Figure 2:
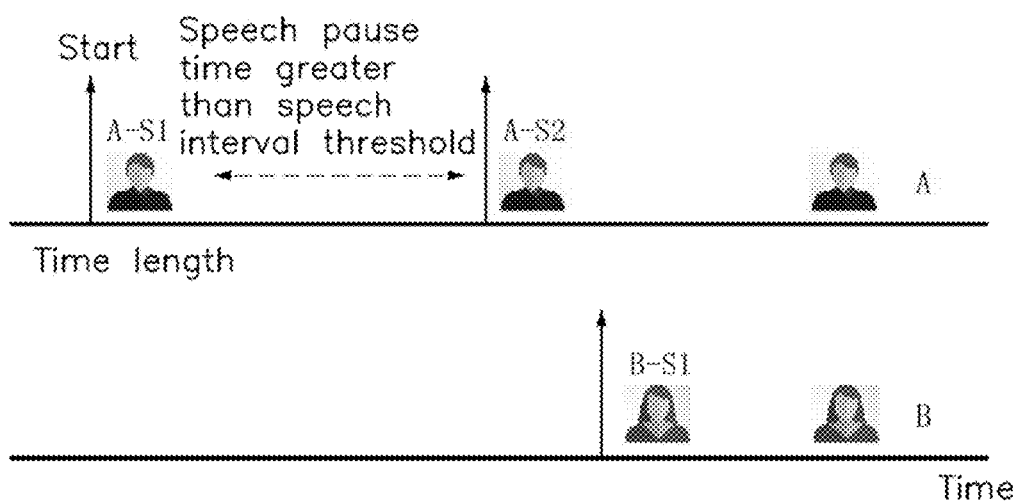
FIG. 2 is a schematic diagram of an example embodiment of the streaming analyzing module analyzing a streaming chunk of the video conferencing record of FIG. 1.

The second electronic device 30 can include a storage device 31, a microprocessor 32, a streaming analyzing module 33, a topic intensity analyzing module 35, a dialogue relevance analyzing module 37, and a controlling module 38. In at least one embodiment, the streaming analyzing module 33, the topic intensity analyzing module 35, the dialogue relevance analyzing module 37, and the controlling module 38 are comprised of computerized instructions in the form of one or more computer-readable programs stored in the storage device 31 and executed by the at least one microprocessor 32. That is, the streaming analyzing module 33, the topic intensity analyzing module 35, the dialogue relevance analyzing module 37, and the controlling module 38 are executed by at least one microprocessor 17. FIG. 2 shows only one example of the playback system 100, other examples may comprise more or fewer components than those shown in the illustrated embodiment, or have a different configuration of the various components. In at least one embodiment, the storage device 31 can be a random access memory (RAM) for temporary storage of information, and/or a read only memory (ROM) for permanent storage of information. In at least one embodiment, the storage device 31 also can be an external storage device, such as an external hard disk, a storage card, or a data storage medium.

The storage device 31 is configured to store the video conferencing record. In at least one embodiment, the video conferencing record can include a plurality of keyword indexes, such as a video conferencing content, participant identities, participant names, participant groups, or participant topics.

Figure 3:
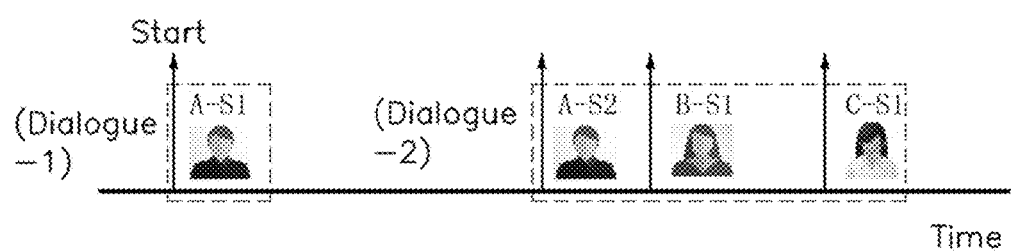
FIG. 3 is a schematic diagram of an example embodiment of the topic intensity analyzing module analyzing the video conferencing record topic intensity of FIG. 1.

FIG. 2 illustrates an embodiment of the streaming analyzing module 33 of the playback system 100. The streaming analyzing module 33 is configured to analyze the streaming chunks in relation to each participant. For example, the streaming analyzing module 33 can set a speech interval threshold and is configured to filter impurities and noise to determine whether and when a participant is speaking. In at least one embodiment, the speech interval threshold can be 0.2 seconds, or greater or less than this period. Referring to FIG. 3, when a speech pause time of a participant is less or equal to the speech interval threshold, the streaming analyzing module 33 can determine that two adjacent chunks can be combined into a single streaming chunk. When a speech pause time of a participant is greater than the speech interval threshold, the streaming analyzing module 33 can determine that a short streaming chunk is ended.

FIG. 3 illustrates an embodiment of the topic intensity analyzing module 35 of the playback system 100. The topic intensity analyzing module 35 is coupled to the streaming analyzing module 33 and is configured to recognize each dialogue in the video conferencing record according to each of the plurality of streaming chunks, and the dialogues can be stored in the storage device 31. In at least one embodiment, when at least two participants are involved in a streaming chunk, the topic intensity analyzing module 35 can set a topic intensity threshold to determine whether the streaming chunk includes a dialogue. In at least one embodiment, the maximal value of a topic intensity can be 1, and the topic intensity threshold can be any value less than the maximal value, such as 0.7 or 0.5.

Figure 4:
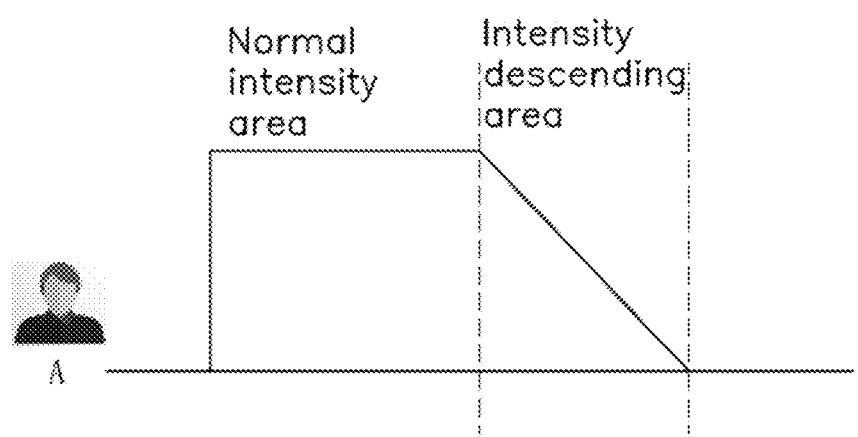
FIG. 4 is a schematic diagram of an example embodiment of the streaming chunk of FIG. 2.
Figure 5:
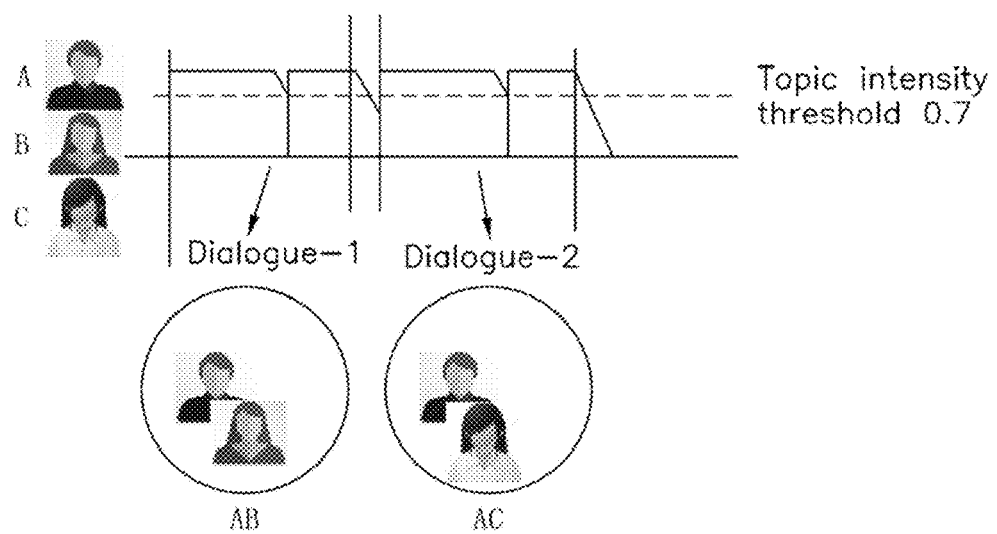
FIG. 5 is a schematic diagram of an example embodiment of two dialogues defined within a streaming chunk of FIG. 2.
Figure 6:
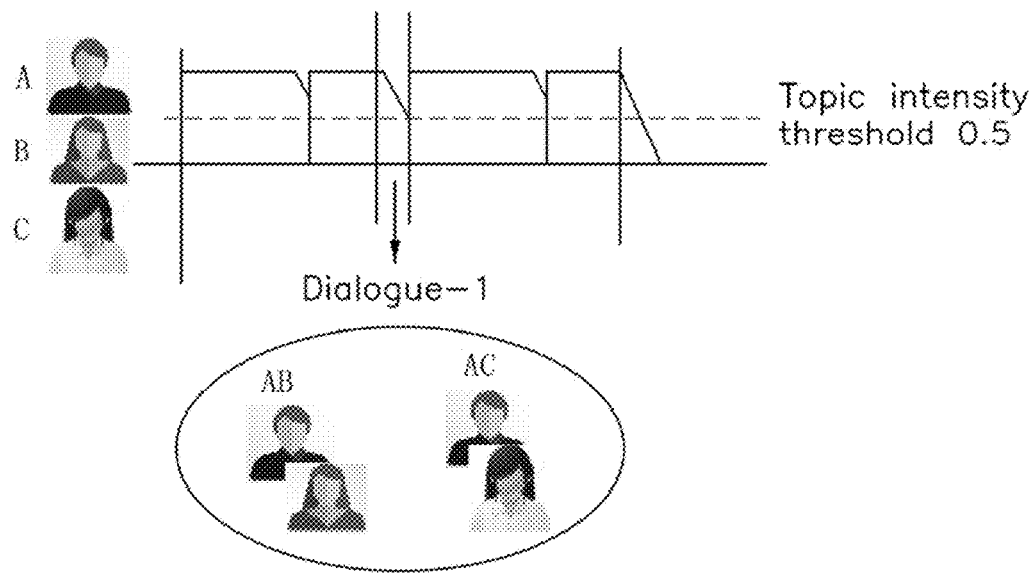
FIG. 6 is a schematic diagram of an example embodiment of a dialogue defined within the streaming chunk of FIG. 5.

FIG. 4 illustrates an embodiment of the topic intensity analyzing module 35 of the playback system 100. The topic intensity analyzing module 35 is configured to distinguish a normal intensity area and an intensity descending area within a streaming chunk. For example, when a participant stops speaking, the topic intensity can pass from the normal intensity area to become the intensity descending area. That is, if the intensity descending area represents a long period of time, the spoken content may be confusing and difficult to understand, and if the length of intensity descending area is short, the speaking content may be easy to understand. Referring to FIG. 5, when the speaking intensity value of adjacent participants is greater than the topic intensity threshold, the two adjacent streaming chunks which are relevant can be determined to be a single dialogue. When the speaking intensity value of adjacent participants is less than the topic intensity threshold, the two adjacent streaming chunks will be determined to not be a single dialogue. That is, if the topic intensity threshold is high, there are more topics in adjacent steaming chunks/the dialogue in the adjacent streaming chunks are more. If the topic intensity threshold is low, the dialogue in the adjacent streaming chunks are few. In FIG. 5, the topic intensity threshold is 0.7, and there are two dialogues in adjacent streaming chunks. In FIG. 6, the topic intensity threshold is 0.5, and there is only one dialogue in adjacent streaming chunks.

Figure 7:
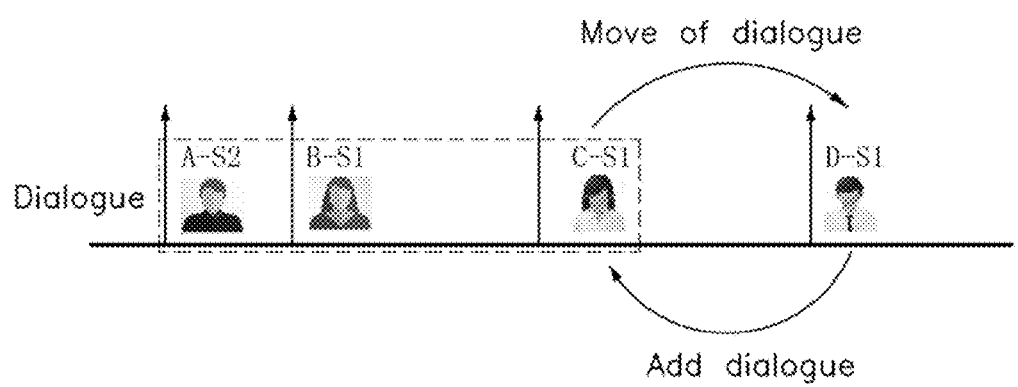
FIG. 7 is a schematic diagram of an example embodiment of a dialogue relevance analyzing module analyzing the dialogue of FIG. 6.
Figure 8:
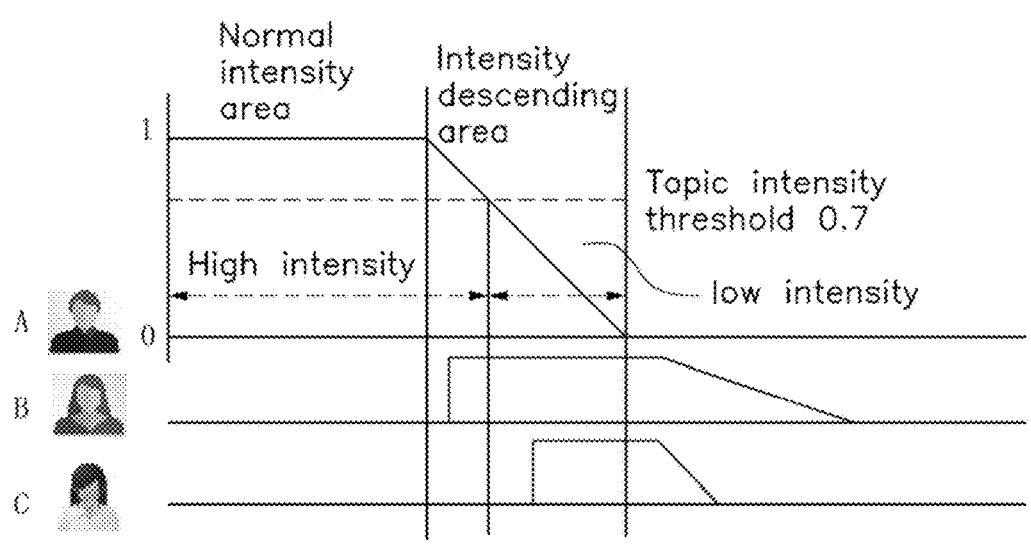
FIG. 8 is similar to FIG. 7, but a topic intensity threshold of FIG. 8 is different to that topic intensity of FIG. 7.

FIGS. 7-8 illustrate an embodiment of the dialogue relevance analyzing module 37 of the playback system 100. The dialogue relevance analyzing module 37 is configured to analyze the individual relevance of a plurality of streaming chunks. For example, if the relative relevance between two streaming chunks is low, the two streaming chunks cannot be determined to be a single dialogue, and if the relative relevance between two streaming chunks is high, the two streaming chunks can be determined to be a single dialogue. In at least one embodiment, the recognition key of the relevance can include one or more of the following features; a facial expression, a tone of voice, a body movement, or body gesture, a particular expression, a keyword, or a defined event. In at least one embodiment, the normal intensity area can be defined as being a high intensity area, and the intensity descending area can be defined as being a low intensity area. The dialogue relevance analyzing module 37 can be configured to analyze the dialogue in the high intensity area to determine whether a streaming chunk in the high intensity needs to be moved out of the dialogue. The dialogue relevance analyzing module 37 also can be configured to analyze the dialogue in the low intensity area to determine whether a streaming chunk in the low intensity area needs to be added into a dialogue. For example, if the dialogue relevance analyzing module 37 finds a plurality of streaming chunks in the high intensity area which are irrelevant, which has been determined to a dialogue by the topic intensity analyzing module 35, can be disassociated from the dialogue by the dialogue relevance analyzing module 37. In at least one embodiment, the dialogue relevance analyzing module 37 can disassociate and remove irrelevant streaming chunks by reducing the intensity descending area or by increasing the topic intensity threshold. If the dialogue relevance analyzing module 37 finds a plurality of streaming chunks in the low intensity area which are relevant, which has not been determined to a dialogue by the topic intensity analyzing module 35, can be added into the dialogue by the dialogue relevance analyzing module 37. In at least one embodiment, the dialogue relevance analyzing module 37 can add relevant streaming chunks into the dialogue by lengthening the intensity descending area or by reducing the topic intensity threshold.

The streaming analyzing module 33, the topic intensity analyzing module 35, and the dialogue relevance analyzing module 37 can analyze every streaming chunk in relation to each participant, in relation to all the dialogues in the video conferencing record, in relation to each speaker in each dialogue, in relation to dialogues per participant, and in relation to every streaming chunk relevant to each dialogue.

Figure 9:
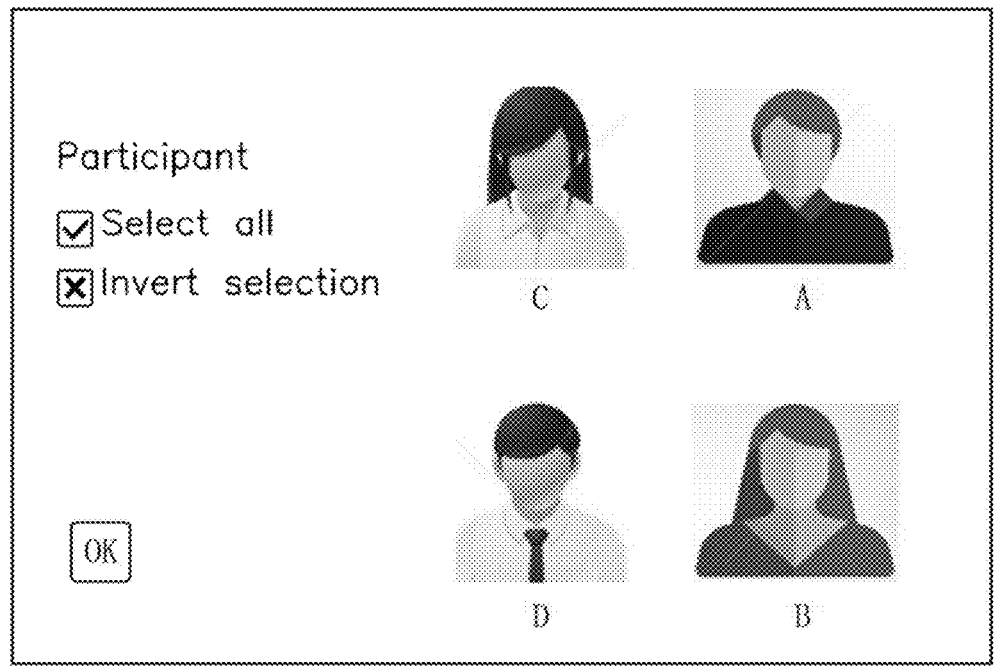
FIG. 9 is a schematic diagram of an example embodiment of a participating group for a keyword index, shown on a display.
Figure 10:
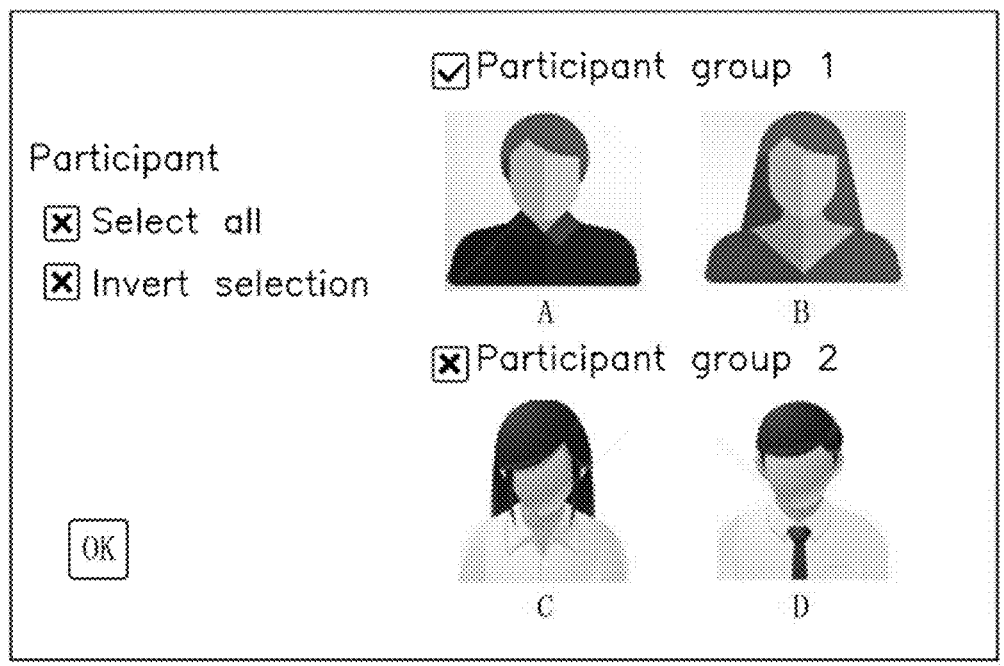
FIG. 10 is a schematic diagram of an example embodiment of multiple participating groups for a keyword index, shown on the display.
Figure 11:
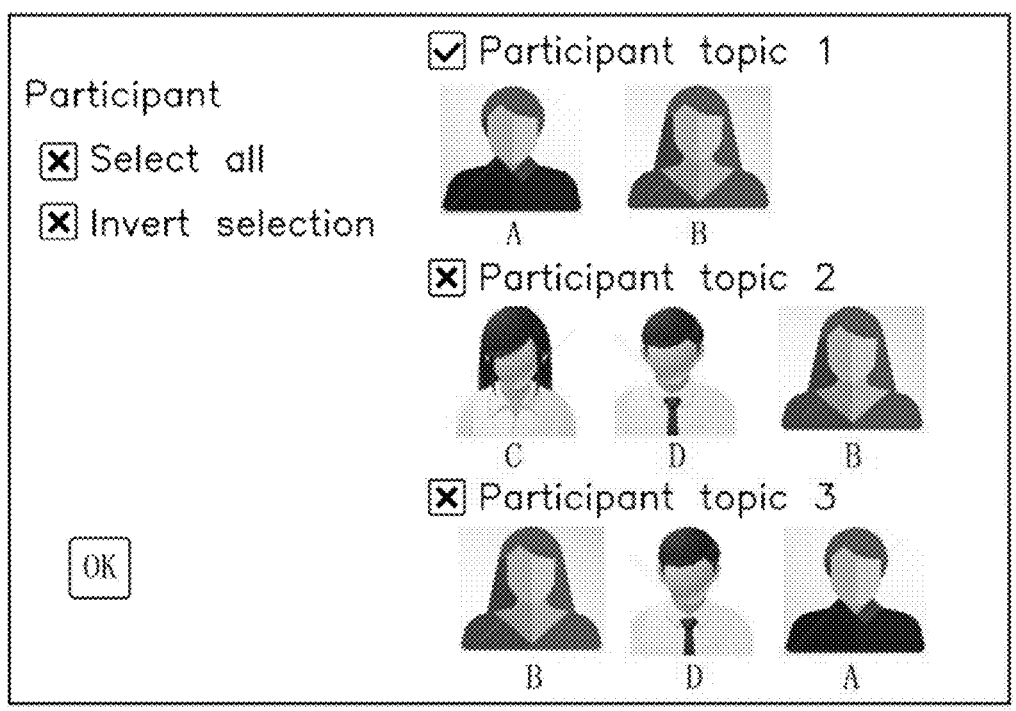
FIG. 11 is a schematic diagram of an example embodiment of a participating topic for a keyword index, shown on the display.

FIGS. 9-11 illustrates an embodiment of the controlling module 38 of the playback system 100. The controlling module 38 is configured to retrieve a video conferencing record clip from the storage device 31 according to a keyword index, and to show the same on a display 39 of the second electronic device 30. In at least one embodiment, the keyword indexes, such as the video conferencing content, the participant identities, the participant names, the participant groups, and the participant topics can be shown on the display 39 to be selected.

FIG. 10 illustrates a participant name being selected. When the participant name is selected, the controlling module 38 can select one or more corresponding video conferencing record clips to display on the display 39. For example, there are four participants A, B, C, D. When any one of the four participants A, B, C, or D is selected, the controlling module 38 can select the one or more video conferencing record clips which correspond to a participant A, B, C, or D, to display on the display 39. In at least one embodiment, when any one of the four participants A, B, C, D is selected, the controlling module 38 also can select the corresponding dialogue of that participant to display on the display 39.

FIG. 10 shows a participant group being selected. When the participant group is selected, the controlling module 38 can select the one or more dialogues of that participant group, to display on the display 39. For example, there are two participant groups AB and CD, and when either one is selected, the controlling module 38 can select the corresponding one or more dialogues to display on the display 39.

FIG. 11 shows a participant topic being selected. When the participant topic is selected, the controlling module 38 can select the corresponding dialogue of the participant topic to display on the display 39. Participant topics can include for example a performance report, a customer issue complaint, a product market analysis report, or a product market survey report. For example, there may be a first participant topic, a second participant topic, and a third participant topic. When any one of these participant topics is selected, the controlling module 38 can select the corresponding dialogue of the relevant participant topic to display on the display 39.

In at least one embodiment, the controlling module 38 can automatically select a long streaming chunk, a dialogue of general interest, or a popular dialogue to display on the display 39. The dialogue of general interest and the popular dialogue can be defined according to number of times discussed or a keyword of high frequency.

Figure 12:
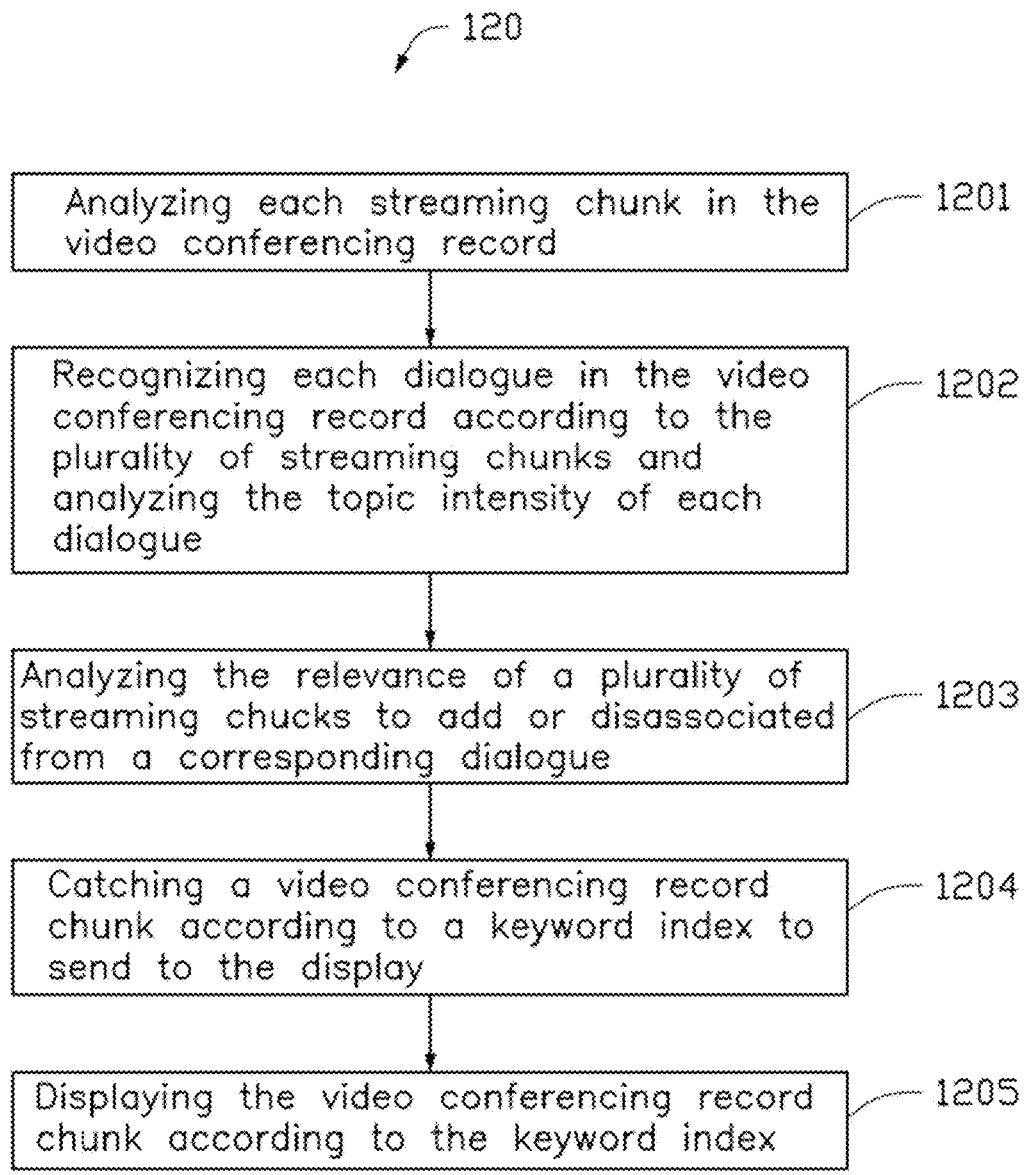
FIG. 12 is a flowchart of a playback method for a video conferencing record using the playback system of FIG. 1.

Referring to FIG. 12, a flowchart is presented in accordance with an example embodiment. The example method 300 is provided by way of example, as there are a variety of ways to carry out the method. The method 120 described below can be carried out using the configurations illustrated in FIGS. 1-11, for example, and various elements of these figures are referenced in explaining example method 120. Each block shown in FIG. 1 represents one or more processes, methods, or subroutines, carried out in the exemplary method 120. Additionally, the illustrated order of blocks is by example only and the order of the blocks can change. The exemplary method 120 can begin at block 1201.

At block 1201, analyzing each streaming chunk of each participant in the video conferencing record by the streaming analyzing module 33.

At block 1202, recognizing each dialogue in the video conferencing record according to the plurality of streaming chunks, and analyzing the topic intensity of each dialogue by the topic intensity analyzing module 35.

At block 1203, analyzing the relevance of a plurality of streaming chunks to add or disassociate from a corresponding dialogue by the dialogue relevance analyzing module 37. For example, the normal intensity area can be defined to a high intensity area, and the intensity descending area can be defined to a low intensity area. The dialogue relevance analyzing module 37 analyzes the dialogue in the high intensity area to determine whether a streaming chunk in the high intensity area needs to be moved out of the dialogue. The dialogue relevance analyzing module 37 also can be configured to analyze the dialogue in the low intensity area to determine whether a streaming chunk in the low intensity area needs to be added into the dialogue. For example, if the dialogue relevance analyzing module 37 searches a plurality of irrelevant streaming chunks in the high intensity area, which has been determined to a dialogue by the topic intensity analyzing module 35, can be moved out of the dialogue by the dialogue relevance analyzing module 37. In at least one embodiment, the dialogue relevance analyzing module 37 moves out of the irrelevant streaming chunks via shortening the intensity descending area or increase the topic intensity threshold. If the dialogue relevance analyzing module 37 searches a plurality of relevant streaming chunks in the low intensity area, which has not been determined to a dialogue by the topic intensity analyzing module 35, can be added into the dialogue by the dialogue relevance analyzing module 37. In at least one embodiment, the dialogue relevance analyzing module 37 adds the relevant streaming chunks into the dialogue via lengthening the intensity descending area or reducing the topic intensity threshold.

At block 1204, catching a video conferencing record clip from the storage device 31 according to a keyword index to send to the display 39 by the controlling module 38. In at least one embodiment, the keyword indexes, such as the video conferencing content, the participant identity, the participant name, the participant group and the participant topic can be shown on the display 39 to be selected.

At block 1205, displaying the video conferencing record clip according to the keyword index by the display 39. For example, there are four participants A, B, C, D, when anyone of the four participants A, B, C, D is selected, the controlling module 38 can select the corresponding video conferencing record clip of participants of A, B, C, or D to display on the display 39. In at least one embodiment, when anyone of the four participants A, B, C, D is selected, the controlling module 38 also can select the corresponding dialogue of participants of A, B, C, or D to display on the display 39. For example, there are two participant groups AB and CD, when anyone of the two participant groups AB and CD is selected, the controlling module 38 can select the corresponding dialogue of the two participant groups AB and CD to display on the display 39. There are a first participant topic, a second participant topic, and a third participant topic. When anyone of the first participant topic, the second participant topic and the third participant topic is selected, the controlling module 38 can select the corresponding dialogue of the first participant topic, the second participant topic and the third participant topic to display on the display 39.

The embodiments shown and described above are only examples. Many details are often found in the art such as the other features of a playback system for a video conferencing record and a related method. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:
1. A playback system for a video conferencing record comprising:

a first electronic device configured to obtain a video conferencing record which comprises a plurality of streaming chunks; and a second electronic device coupled to the first electronic device and configured to receive the video conferencing record;

wherein the second electronic device is configured to:
analyze each of the plurality of streaming chunks in the video conferencing record;
recognize, according to the plurality of streaming chunks, each dialogue in the video conferencing record analyze the topic intensity of each dialogue;
analyze a relevance of a plurality of streaming chunks to add or disassociated from a corresponding dialogue;
take a video clip of the video conferencing record according to a keyword index; and
display the video clip according to the keyword index.

2. The system of claim 1, wherein the keyword index is a participant identity, a participant name, a participant group, or a participant topic.

3. The system of claim 1, wherein the second electronic device is configured to set a topic intensity threshold, when a speaking intensity value of every two adjacent participants is greater than the topic intensity threshold, the two adjacent streaming chunks can be determined to a dialogue, and when the speaking intensity value of every two adjacent participants is less than the topic intensity threshold, the two adjacent streaming chunks cannot be determined to a dialogue.

4. The system of claim 3, wherein each streaming chunk comprises an intensity descending area, and the second electronic device is configured to add or disassociated from the corresponding dialogue via adjusting the intensity descending area and adjusting the topic intensity threshold.

5. The system of claim 1, wherein a recognition key of the relevance of the plurality of streaming chunks comprises the following one or more: a face, a voice, a body movement and gesture, an expression, a keywords, a speech or a defined event.

6. The system of claim 1, wherein the second electronic device is configured to automatically select a long streaming chunk, an interested dialogue or a pop dialogue to display on the display, and the interested dialogue and the pop dialogue is defined according to an interaction times or a high frequency keywords.

7. A playback method for a video conferencing record, comprising:
 (a) analyzing each streaming chunk in the video conferencing record;
 (b) recognizing each dialogue in the video conferencing record according to the plurality of streaming chunks to analyze the topic intensity of each dialogue;
 (c) analyzing a relevance of a plurality of streaming chunks to add or disassociated from a corresponding dialogue;
 (d) catching a video clip of the video conferencing record according to a keyword index; and
 (e) displaying the video clip according to the keyword index.

8. The playback method of claim 7, wherein the step (b) comprises following step (b1): setting a topic intensity threshold, when a speaking intensity value of every two adjacent participants is greater than the topic intensity threshold, determining the two adjacent streaming chunks to a dialogue, and when the speaking intensity value of every two adjacent participants is less than the topic intensity threshold, determining the two adjacent streaming chunks not to a dialogue.

9. The playback method of claim 8, wherein each streaming chunk comprises an intensity descending area, and the step (c) comprises following step (c1): adding or moving out of the corresponding dialogue via adjusting the intensity descending area and adjusting the topic intensity threshold.

10. The playback method of claim 7, wherein a recognition key of the relevance of the plurality of streaming chunks comprises the following one or more: a face, a voice, a body movement and gesture, an expression, a keywords, a speech or a defined event.

11. The playback method of claim 7, wherein the step (d) comprises following step (d1): automatically selecting a long streaming chunk, an interested dialogue or a pop dialogue to display on the display, and the interested dialogue and the pop dialogue is defined according to an interaction times or a high frequency keywords.

12. The playback method of claim 7, wherein the keyword index is a participant identity, a participant name, a participant group, or a participant topic.

* * * * *